United States Patent Office 2,695,260
Patented Nov. 23, 1954

2,695,260

PROCESS FOR THE OXYGENATION OF STEROIDS WITH THE OXYGENATING ACTIVITY OF NEUROSPORA

Herbert C. Murray, Hickory Corners, and Durey H. Peterson, Kalamazoo, Mich., assignors to The Upjohn Company, Kalamazoo, Mich., a corporation of Michigan No Drawing. Application August 28, 1952, Serial No. 306,930

31 Claims. (Cl. 195—51)

The present invention relates to a novel method for the introduction of oxygen into a steroid molecule. This application is a continuation-in-part of our prior-filed applications Serial No. 297,242, filed July 5, 1952; Serial No. 272,944, filed February 23, 1952, and issued as Patent 2,602,769; and Serial No. 180,496, filed August 19, 1950, and now abandoned, and relates more especially to an aerobic fermentation process wherein fermentation and oxygenation of steroids may be accomplished by means of fungi of the genus Neurospora.

It is already known to introduce oxygen into a steroid molecule, particularly into the eleven position, for the production of intermediates useful in the preparation of therapeutic compounds, or for the production of the drugs themselves, which intermediates or drugs have an oxygenated structure, particularly an eleven oxygenated structure, among which may, for example, be mentioned corticosterone, 11-dehydrocorticosterone (compound E, cortisone), and 17-hydroxycorticosterone (compound F). Such result has been accomplished, heretofore only through highly involved organic synthesis necessitating a considerable number of steps. More recently, the introduction of oxygen into a steroid molecule by means of Mucorales fungi has been described by Murray and Peterson, United States Patent 2,602,769, issued July 8, 1952. It has additionally been found that fungi of the genus Neurospora, e. g., *Neurospora sitophila* and *Neurospora crassa*, are useful in the oxygenation of steroids, including eleven desoxy sheroids, although not necessarily producing the same result as the fungi of the Mucorales order.

It is an object of the present invention to provide a novel method for the introduction of oxygen into a steroid molecule. Another object of the invention is the provision of such method whereby an eleven desoxy steroid (the term "eleven desoxy steroid" is employed throughout to indicate a steroid which contains no oxygen in the eleven position) is converted to an eleven oxygenated steroid by the action of a species of fungus of the genus Neurospora. Another object of the invention is the provision of a process for the introduction of oxygen into at least the eleven position of an eleven desoxy steroid through the action of fungus of the genus Neurospora. Another object of the invention is to provide a process of oxygenating 3-keto steroids by means of Neurospora. Still another object of the invention is the provision of a process of modifying steroid structure by means of Neurospora. Other and more particular objects of the invention will become apparent hereinafter.

It has now been found that eleven desoxy steroids, which contain the cyclopentanopolyhydrophenanthrene nucleus, especially the 10,13-dimethylcyclopentanopolyhydrophenanthrenes, can be readily converted in high yields to corresponding oxygenated steroids by subjecting the steroid compound to the action of a species of fungus of the genus Neurospora. By the method of the present invention, an efficient, economical, and commercially satisfactory method of introducing oxygen into the eleven position of an eleven desoxy steroid molecule is provided. Accordingly, a novel and simple approach to the production of eleven oxygenated steroid drugs is afforded, which is, as previously stated, of great importance to the chemical, pharmaceutical and medical professions, and of especial value in the treatment of physiological abnormalities known to be beneficially affected only by such eleven oxygenated drugs.

The method of the present invention, in its broader aspects, consists in fermenting a steroid or an eleven desoxy steroid by means of a species of fungus of the genus Neurospora. Another way of expressing one of the results of the process of the present invention is to say that the steroid is "oxygenated" since an oxygen atom is introduced thereinto. Other positions as well as the eleven position of the steroid molecule may undergo transformation due to the action of the fungus, but such transformations are not to be regarded as undesirable, since the introduction of oxygen into other portions of the steroid molecule may result in valuable therapeutic products or intermediates, for example those containing a hydroxy group at the 17 position. In case such additional groups are not considered desirable, methods are available for the removal of such groups with facility. An important advantage of the present invention is the oxygenation of eleven desoxy steroids in the eleven position. Hydroxy groups which are themselves capable of oxidation to keto groups, when present in the molecule of a steroid to be oxygenated, may, if considered necessary, as where exceedingly high yields of eleven oxygenated hydroxysteroid product are sought to be produced, be protected from attack of various types, including attack by the oxidizing fungi, by conversion, as for example by esterification, etherification, halogenation, or the like, to a group which is reconvertible to a hydroxy group. However, such procedure is not a prerequisite to the introduction of oxygen, especially eleven oxygen, into a hydroxysteroid by the method of the present invention.

The steroids operative in the method of the present invention are not limited as to type or number of substituents, and for operativeness in the process need only contain a nuclear unoxygenated or oxygenatable position, such as, for example, an unoxygenated eleven position; illustratively, a methylene group, as in an eleven desoxy steroid. Such compounds contain the nucleus:

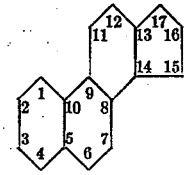

which may in addition contain substituents or combinations of substituents about the nucleus, as in the 1,2,3,4,5,6,7,8,9,10,12,13,14,15,16, and 17 positions, especially 10,13-dimethyl groups, 3,7, or 12 keto, hydroxy, or acyloxy groups; 17-side chains of which the progesterone and corticosterone (ketol) side chains deserve special mention; a 17 keto group; a 17 hydroxy group, and the like; as well as double bonds in the 4,5,6,7,8,9(11),11(12),16(17) and other positions, or combinations of positions, about the nucleus; or double bonds saturated by addition thereto of halogen or hydrogen halide; adducts of dienophiles such as maleic acid, maleic anhydride, or maleic acid esters with steroids having a conjugated double bond system, as at 5,7; and other substituents and combinations of substituents, double bonds and so forth too numerous for special mention, a great many of which are known in the steroid art. The presence or absence of unsaturation at the 9(11) or 11(12) positions of the nucleus is not a critical factor in the method of the present invention, for while it is preferred to apply the process to a steroid having an eleven methylene group, i. e., a steroid having two hydrogen atoms at carbon atom eleven or no unsaturation in the 9(11) or 11(12) positions, for reasons of economy and to obviate unnecessary transformations of saturated to unsaturated compounds, the fermentation may be applied with equal facility to either the saturated or unsaturated compounds.

Representative steroids which may be fermented by the method of the invention include, for example, progesterone, 9(11) or 11(12) - dehydroprogesterone, 7,9(11)- bisdehydroprogesterone, 17 - hydroxyprogesterone, 17α-progesterone, testosterone, pregnenolones, 3 - hydroxy-5 - pregnene - 20 - one, pregnenolone, 3β - hydroxy - 5,16-pregnadiene - 20 - one, acyloxypregnenolones such as pregnenolone acetate, 3 - hydroxy - 5,6 - oxidopregnane-20 - one (α- or β-oxido), 3 - hydroxy - 5 - chloropregnane - 20 - one, 5,6 - oxidopregnane - 3,20 - dione (α- or β-oxido), 4 - bromo and 4 - chloropregnane - 3,20 - dione, 5 - chloropregnane - 3,20 - dione, 3 - ketopregnane - 20-ol, 3 - keto - allopregnane - 20 - ol, 3β - hydroxy - 16,17-oxido - 21 - acetoxy - 5 - pregnene - 20 - one, 3β - hydroxy-16,17 - oxido - 5 - pregnene - 20 - one, 3β - hydroxy-5,6,21 - tribromo - 16,17 - oxidopregnane - 20 - one, 3β-hydroxy - 16 - bromo - 17 - hydroxy - 5 - pregnene - 20-one, 3β - hydroxy - 16 - chloro - 17 - hydroxy - 5 - pregnene - 20 - one, 3β - hydroxy - 5(6), 16(17) - dioxido-pregnane - 20 - one, 3β - hydroxy - 5(6), 16(17) - dioxido-21 - bromopregnane - 20 - one, 3β - hydroxy - 5(6), 16(17) - dioxido - 21 - acetoxypregnane - 20 - one, 3β-hydroxy - 5(6), 16(17) - dioxido - 21 - hydroxypregnane-20 - one, 11 - desoxycorticosterone, delta - 9(11) or 11(12) - desoxycorticosterone, 11 - desoxy - 17 - hydroxycorticosterone and acyloxy derivatives, such as the acetoxy derivative, thereof, 21-hydroxypregnenolone and 21-acyl, e. g. acetyl, esters thereof, 17,21-dihydroxypregnenolone and 17,21-diacyloxy derivatives thereof, e. g. the diacetoxy derivative, androstenedione, androstan-17-ol, 9(11) or 11(12) dehydroandrostenedione, 3-hydroxy-9(11) or 11(12) - pregnen - 20 - ones, 3,21 - dihydroxy - 9(11) or 11(12) - pregnen - 20 - ones, 3,17,21 - trihydroxy - 9(11) or 11(12) - pregnen - 20 - ones, 4 - androsten - 3 - ol - 17-one and 3-acyl, e. g. acetyl, esters thereof, 5-androsten-3-ol-17-one and 3-acyl, e. g. acetyl, esters thereof; ergosterol, stigmasterol, stigmastanol, and 3-acyl, e. g. acetyl, esters of the foregoing; ergostenone, stigmastenone, stigmastanone, cholestenone, cholic acid, desoxycholic acid, lithocholic acid, cholanic acid, norcholanic acid, bisnorcholanic acid, cholenic acid, norcholenic acid, bisnorcholenic acid, and 3-hydroxy-, 3-keto-, 3,7-dihydroxy-, 3,7-diketo-, 3,7,12-trihydroxy-, 3,7,12-triketo-, 9(11) or 11(12)-unsaturated, ester, thiolester, and further derivatives of the foregoing acids, and the like. Suitably a steroid having up to and including 22 carbon atoms in the carbon to carbon skeleton or a steroid having a two carbon atom side chain at the 17 position and an eleven methylene group may be used. The 10-nor-methyl, the 13-nor-methyl, and the 10,13-bisnor-methyl forms of each of the above steroids, in which either one or both of the 18 and 19 position angular methyl groups are replaced by hydrogen, are included within the purview of those steroids which may be fermented by the method of this invention. In the event that the 11-position is already oxygenated or substituted, the dominant product may be oxygenated additionally in another position. The 16-dehydro form of each of the above steroids is likewise included. Within the purview of this invention is the fermentation of D-homosteroids otherwise known as perhydrochrysenes, for example, D-homo-4-androstene-3,17a-dione, D-homo-testosterone, D - homo - 17aα - methyltestosterone, D-homo - 17aβ - methyltestosterone, 17a - methyl - 17a-hydroxy - D - homo - 4 - androstene - 3,17 - dione, and their 4,5-dihydro, ring A saturated analogs, D-homo-androstenones (3α- or 3β-hydroxyandrostane-17a-one), and D - homo - epidehydroandrosterone (3β - hydroxy-D - homo - 4 - androstene - 16a - one). All of these are amenable to fermentation with Neurospora fungi in accordance with the presented examples.

In the process of the present invention, the operational conditions and reaction procedure and details may be those of parent application Serial No. 180,496, filed August 19, 1950, utilizing the action of a species of fungus of the genus Neurospora. The genus Neurospora belongs to the family Melanosporaceae of the order Sphaeriales. Among species of the genus Neurospora useful in the fermentation of steroids may be mentioned *Neurospora sitophila, Neurospora crassa, Neurospora tetrasperma* and their mutants, a number of which have been extensively used in the study of microbiological genetics. While Neurospora are deficient for biotin and some are self sufficient for other vitamins and amino acids, other Neurospora, particularly mutants, are commonly incapable of synthesizing essential metabolites. Therefore consideration must be given to the incorporation in the media of nutritional essentials of various Neurospora, such as for example, para-aminobenzoic acid, choline, inositol, niacin, pantothenic acid, pyridoxine, riboflavin, thiamin, arginine, isoleucine, leucine, lysine, methionine, phenylalanine, proline, threonine, tryptophane, and valine. Some mutants incapable of synthesizing otherwise essential glutamic acid or aspartic acid may have their nutritive requirements fulfilled by the presence of other acids as α-ketoglutaric acid, succinic acid, malic acid, or fumaric acid which are thought to be involved in the Krebs isocitric acid cycle in the conversion of carbohydrate to aspartic and glutamic acids.

Culture of the fungi, for the purpose and practice of the present invention, is in or on a medium favorable to the development of the fungi. Solid media may be utilized, but the preferred media are those which permit quantity growth under aerobic conditions. Moist solid particulate media such as bran, cereal grains, cereal grits, wood chips, shavings, sawdust, cornhusks, fibrous material, such as copra, chestnuts, or lupine seeds may be used. These can be extracted with alcohol, ether or other organic solvents, to remove objectionable contaminants and growth inhibitors prior to fermentation. The carriers may optionally contain added growth factors and nutrients and may be used in layers or trays with or without auxiliary aeration, in towers as in the vinegar process or under conditions of agitation as for example by tumbling in a rotating drum. Liquid media, illustratively brewer's wort, are well adapted to use under aerobic layer or more especially aerobic submerged fermentation conditions. Suitably the media should contain sources of available carbon, nitrogen and minerals although of course there can be significant growth and development under less than optimum conditions.

Available carbon may be from carbohydrates, starches, gelatinized starches, dextrin, sugars, molasses as of cane, beet and sorghum, glucose, fructose, mannose, galactose, maltose, sucrose, lactose, pentoses, amino acids, peptones or proteins. Carbon dioxide, glycerol, alcohols, acetic acid, sodium acetate, citric acid, sodium citrate, lower fatty acids, higher fatty acids, or fats are illustrative of other materials which provide assimilable carbon for the energy requirements of the fungi. Mixtures of various carbon sources are sometimes advantageous.

Nitrogen in assimilable form may be provided by soluble or insoluble vegetable or animal proteins, soybean meal, lactalbumin, casein, egg albumin, peptones, polypeptides or amino acids, urea, ammonium salts, ammonia trapped on base exchange resins or on zeolites, ammonium chloride, sodium nitrate, potassium nitrate, morpholine. Whey, distillers solubles, corn steep liquor, or yeast extract have been useful.

As mineral constituents the media or menstruum may contain, naturally present or added, available aluminum, calcium, chromium, cobalt, copper, gallium, iron, magnesium, molybdenum, potassium, scandium, uranium, vanadium, and boron. Sulfur may be provided by sulfates, alkyl sulfonates, sulfoxylates, sulfamates, sulfinates, free sulfur, hyposulfite, persulfate, thiosulfate, methionine, cystine, cystein, thiamin or biotin. Phosphorus, preferably pentavalent, suitably in a concentration at or about 0.001 to 0.07 molar and particularly at or about 0.015 to 0.02, may be present as ortho-, meta-, or pyrophosphates, salts or esters, phytin, phytic acid, phytates, glycerophosphate, sodium nucleinate, casein or ovovitellin. Boron, iodine and selenium in traces may be advantageous. Desirably boron, in the form of boric acid or sodium borate, borax, may be present or added especially after germination and early growth of the fungus.

Other accessory growth factors, vitamins, auxins and growth stimulants may be provided as needed or desired.

While solid or liquid media may be utilized, liquid media is preferred as it favors mycelial growth.

Suspending or mycelial carriers such as filter earths, filter aids, finely divided cellulose, wood chips, bentonite, calcium carbonate, magnesium carbonate, charcoal, activated carbon or other suspendable solid matter, methyl cellulose, carboxymethyl cellulose or alginates may be added to facilitate fermentation, aeration and filtration.

The selected species of fungus is grown either in light or darkness on a medium containing available carbon, illustratively carbohydrates such as sugars or starches; assimilable nitrogen, illustratively soluble or insoluble proteins, peptones or amino acids; and mineral constituents, illustratively phosphates and magnesium sulfate; and other art recognized, desirable or adventitious, additions The medium may desirably have a pH before inocula tion of between about 2.8 and 8.8 although a higher or lower pH may be used. A pH of about 3 to 7 is preferred for the growth of Neurospora. Low pH values inhibit bacterial contamination and facilitate sterilization. For example, at a pH of 2 to 3, effective sterilization of media may be accomplished by heating the media for thirty minutes at 100 degrees centigrade, whereas, at a pH of 4 to 4.5, thermal sterilization may require superatmospheric pressure. Alternatively or concomitantly, bacterial contamination may be retarded by the presence of antiseptic or antibiotic agents such as benzoates, sulfites, penicillin or circulin.

Inoculation of the fungal growth-supporting medium with the selected fungus of the genus Neurospora may be accomplished in any suitable manner. Neurospora grow over a wide range of temperatures from about 8 degrees centigrade to about 45 degrees centigrade and preferably at or about room temperature or between about 20 degrees centigrade and 33 degrees centigrade.

The developmental period of fungal growth required before the steroid to be fermented is exposed to the fungus does not appear to be critical. For example, the steroid may be added either before thermal or other sterilization of the medium, at the time of inoculating the medium with the selected Neurospora species, or at some time, as 24 to 48 hours, later. The steroid to be fermented may be added at any suitable concentration although for practical reasons steroid substrate at a concentration of about or up to about 0.6 gram per liter or even 0.8 gram per liter of medium is satisfactory and two grams per liter is operative although higher concentrations, depending upon the particular steroid, may be used with some inhibition of mycelial development. Either a purified steroid, a crude material containing steroid, or a steroid material comprised of or consisting predominantly or essentially of steroid, for example, a mixture of steroid and fat or solvent, may be used as substrate. The addition of steroid substrate to be fermented may be accomplished in any suitable manner especially so as to promote a large surface of contact of the steroid substrate with the oxygenating activity of the fungus, such as by dispersing the steroid substrate, either alone, with a dispersing agent, or in solution in a water-miscible organic solvent, by mixing or homogenizing the steroid substrate with the fungal medium to form a suspension or dispersion of steroid. Either submerged or surface culture procedures may be used with facility, although submerged culture is preferred. Alternatively, steroid fermenting enzymes of a growth of the fungus may be separated from the fungus or medium, admixed with the steroid or a solution or dispersion thereof, and the mixture subjected to aerobic conditions to accomplish fermentation of the steroid.

The temperature during the period of fermentation of the steroid may be the same as that found suitable for fungal growth. It need be maintained only within such range as supports life, active growth, or the enzyme activity of the fungus.

While any form of aerobic incubation is satisfactory for the growth of the selected fungus or fermentation of the steroid substrate, the efficiency of steroid fermentation is related to aeration. Therefore, aeration is usually controlled, as by agitation and/or blowing air through the fermentation medium. Aeration may be effected by surface culture or under-submerged fermentation conditions. Aerobic conditions include not only the use of air to introduce oxygen, but also other sources or mixtures containing oxygen in free or liberatable form. In using air as the aerating medium, a desirable rate of aeration is about four to twenty millimoles of oxygen per hour per liter as determined by the method of Cooper, Fernstrom and Miller, Ind. Eng. Chem., 36, 504 (1944). In the accompanying working examples, aeration concomitant with agitation and stirring corresponds to four, eight or twenty millimoles of oxygen per hour per liter at stirring speeds of 176, 250, or 360 revolutions per minute, respectively. Under some conditions it is desirable to utilize different rates of aeration during the fungus growing or developing stage as contrasted with the steroid fermentation stage. Aeration is suitably modified by using superatmospheric or subatmospheric pressures, for example thirty pounds per square inch or ten pounds per square inch absolute. Oxygen uptake may be facilitated by the presence of various catalyst such as ascorbic acid, glutamic acid, citric acid, lactic acid, tyrosine, or tryptophane.

The time required for the fermentation of steroids varies somewhat with the procedure. When the steroid substrate is present at the time of inoculation of the medium, periods of from 8 to 72 hours may be used. However, when the steroid is added to the fungus, after substantial aerobic growth of the fungal organism, for example after 16 to 24 hours at optimum temperature, the conversion of steroid substrate begins immediately and high yields are obtained in from one to 72 hours, 24 hours being generally satisfactory. The steroids may be fermented in a simultaneous or sequential heterofermentative procedure resulting in other useful products, which are recoverable according to procedures known in the art, including enzymes and acids, for example amylase, invertase, lipase, maltase, protease, proteolytic enzymes, rennet, urease, citric acid, fumaric acid, gluconic acid, itaconic acid, kojic acid and oxalic acid. These fermentation products may be separated from the fermentation beer at the same time, before or after the fermentation is complete with respect to the steroid fermentation products.

After completion of the steroid fermentation, the resulting fermented steroid is recovered from the fermentation reaction mixture. An especially advantageous manner of recovering the fermented steroid involves extracting the fermentation reaction mixture, including the fermentation liquor and mycelia with a water-immiscible organic solvent for steroids, for example, methylene chloride, ethylene chloride, trichloroethylene, ether, amyl acetate, and the like. The fermentation liquor and mycelia may be separated and then separately extracted with suitable solvents. The mycelia may be extracted with either water-miscible or water-immiscible solvents, acetone being effective. The fermentation liquor, freed of mycelia, may be extracted with water-immiscible solvents. The extracts can be combined, either before or after washing with an alkaline solution, illustratively sodium bicarbonate, suitably dried, as for example over anhydrous sodium sulfate, and the purified fermented steroid obtained by recrystallization from organic solvents or by chromatography.

The following examples are illustrative of the process of the present invention and are not to be construed as limiting.

EXAMPLE 1

A medium having a composition of thirty grams of dextrose, twenty grams of corn steep liquor, twelve grams of sodium nitrate, twelve grams of sodium acetate, and one gram of $KH_2PO_4$, diluted to one liter with tap water, was adjusted to a pH of 7.0. After sterilization the pH was 6.7. Twelve liters of this medium was maintained at 25 degrees centigrade and inoculated with Neurospora sitophila, ATCC 9278. The aeration was adjusted to one liter per minute and the agitation was 200 revolutions per minute. After 24 hours of growth, three grams of progesterone, compound I, dissolved in 150 milliliters of acetone was added and fermentation was continued for 48 hours. The mycelium was separated from the whole beer by squeezing through gauze. The separated mycelium was extracted twice, each time with a volume of acetone approximately equal to the volume of the mycelium and again extracted twice, each time with a volume of methylene chloride approximately equal to the volume of the mycelium. The acetone and methylene chloride extracts including solvent were added to the beer filtrate. The mixed extracts and beer filtrate were then extracted four times, each time with three liters of methylene chloride. The combined methylene chloride extract was washed twice, each time with one-tenth by volume portions of a two percent aqueous solution of sodium bicarbonate and then twice with one-tenth by volume portions of water. The methylene chloride extract was dried with anhydrous sodium sulfate and then concentrated to a small volume on a steam bath.

The concentrated extract, freed of solvent, weighed 4.796 grams. This residue was dissolved in 300 milliliters of benzene and chromatographed over 150 grams of alumina (hydrochloric acid washed, water washed, and dried at 120 degrees centigrade for four hours) using 300-milliliter portions of developing solvent as indicated in Table I. Paper chromatography analyses of the eluate solids using a toluene-propylene glycol system and methylcyclohexane-carbitol system demonstrated the production of new steroids. Fraction 12 was dissolved in three milliliters of methylene chloride, filtered, and concentrated to 0.5 milliliter on a steam bath.

*Chromatographic analysis, Table I*

| Fraction | Solvent | Eluate Solids, Milligrams |
|---|---|---|
| 1 | benzene | 105 |
| 2 | do | 64 |
| 3 | benzene-ether 20:1 | 56 |
| 4 | do | 159 |
| 5 | benzene-ether 10:1 | 83 |
| 6 | do | 26 |
| 7 | benzene-ether 1:1 | 33 |
| 8 | do | 129 |
| 9 | ether | 381 |
| 10 | do | 193 |
| 11 | ether-chloroform 20:1 | 398 |
| 12 | do | 517 |
| 13 | ether-chloroform 10:1 | 791 |
| 14 | do | 444 |
| 15 | ether-chloroform 1:1 | 169 |
| 16 | do | 28 |
| 17 | do | 22 |
| 18 | do | 19 |
| 19 | chloroform | 10 |
| 20 | do | 48 |
| 21 | do | 48 |
| 22 | do | 32 |
| 23 | chloroform-acetone 20:1 | 50 |
| 24 | acetone | 257 |
| 25 | methanol | 254 |
| 26 | do | 14 |

To the concentrate, five milliliters of ether was added to precipitate crystals which were filtered and washed three times with two-milliliter portions of ether to leave 203 milligrams of crystals melting at 155 to 173 degrees centigrade. Recrystallization from methylene chloride with ether yielded 120 milligrams of crystals of compound II, an hydroxyprogesterone, having a melting point of 165 to 172 degrees centigrade.

*Oxidation of Compound II*

To fifty milligrams of this compound dissolved in 0.5 milliliter of glacial acetic acid, there was added eleven milligrams of $CrO_3$ in one drop of water. After two hours, one milliliter of methanol was added. After ten minutes more, forty milliliters of water was added with mixing and the mixture was extracted with three ten-milliliter portions of methylene dichloride. The combined extracts were washed with two five-milliliter portions of five percent sodium bicarbonate solution and three five-milliliter portions of water. The washed methylene dichloride extract was then dried over two grams of anhydrous sodium sulfate, filtered, and evaporated on a steam bath to yield 46 milligrams of solids, III. This was dissolved in 0.5 milliliter of ethyl acetate and crystallized by the addition of six drops of Skellysolve B petroleum ether to give 25 milligrams of crystalline compound IV having a melting point of 168 to 176 degrees centigrade. As evidenced by infrared spectra, this compound has retained a hydroxyl group and an extra non-conjugated ketone compared with progesterone.

Repeating the above oxidation procedure with 42 milligrams of compound IV and twenty milligrams of $CrO_3$, there was obtained an oily extract weighing 29.6 milligrams. Crystallization of this from 0.25 milliliter of methanol and 0.25 milliliter of ether gave 21 milligrams of compound V having a melting point of 164 to 168 degrees centigrade. Infrared spectra indicated oxidation had taken place.

*Acetylation of Compound II*

To 46 milligrams of compound II dissolved in 0.8 milliliter of pyridine was added 0.8 milliliter of acetic anhydride. After maintaining the mixture for sixteen hours at room temperature, thirty milliliters of water was added. The diluted mixture was then extracted with three ten-milliliter portions of a mixture of equal parts of ether and chloroform. The combined extracts were washed twice with five-milliliter portions of five percent sodium bicarbonate, twice with five-milliliter portions of five percent hydrochloric acid, and twice with five-milliliter portions of water. The ether-chloroform solution was then dried over three grams of anhydrous sodium sulfate, filtered, and evaporated to give 47 milligrams of an oily residue. Crystallization of this residue from 0.25 milliliter of acetone and 0.25 milliliter of ether yielded 23 milligrams of compound VI having a melting point of 188 to 205 degrees centigrade. Infrared spectra supported the esterification.

Compounds II, IV, V and VI exhibited progesterone activity.

EXAMPLE 2

In the same manner as Example 1, the starting steroid was 17α,21-dihydroxyprogesterone and the resulting fermented steroid was recovered.

EXAMPLE 3

In the same manner as Example 1, the starting steroid was pregnane-3,20-dione and the resulting fermented steroid was recovered.

EXAMPLE 4

In the same manner as Example 1, the starting steroid was 21-hydroxy-4-pregnene-3,20-dione and the resulting fermented steroid was recovered.

EXAMPLE 5

In the same manner as Example 1, the starting steroid was 16-dehydroprogesterone and the resulting fermented steroid was recovered.

EXAMPLE 6

In the same manner as Example 1, the starting steroid was 17α-hydroxyprogesterone and the resulting fermented steroid was recovered.

EXAMPLE 7

Twelve liters of medium having a composition of fifty grams of Cerelose commercial dextrose, thirty grams of sucrose, two grams of ammonium nitrate, one gram of monobasic potassium phosphate, 0.5 gram of magnesium sulfate heptahydrate, 0.01 gram of ferrous sulfate, 0.2 gram of zinc sulfate, 0.1 gram of manganese sulfate, and two grams of yeast extract, diluted to one liter with tap water, was adjusted to a pH of 6.65, sterilized, and cultured for 48 hours with *Neurospora crassa*, ATCC 10336, while agitating at 176 revolutions per minute. After growing for 48 hours, there was added three grams of progesterone dissolved in 150 milliliters of acetone and fermentation was continued for 48 hours. Extraction in accordance with Example 1 produced four new steroids.

EXAMPLE 8

A medium having a composition of twenty grams of Cerelose dextrose, twenty grams of corn steep liquor, two grams of sodium nitrate, two grams of sodium acetate, one gram of $KH_2PO_4$, 0.5 gram of magnesium sulfate, 0.2 gram of potassium chloride, and 0.01 gram of ferrous sulfate, diluted to one liter with tap water, was adjusted to a pH of 4.7. Twelve liters of the sterilized medium was inoculated with *Neurospora crassa*, ATCC 10336; three grams of progesterone dissolved in 150 milliliters of acetone was added. After culturing for 48 hours at 25 degrees centigrade with agitation at 250 revolutions per minute, the fermented steroid was extracted and separated as in Example 1.

EXAMPLE 9

A medium was prepared from five milliliters of corn steep liquor, twenty grams of Edamine commercial lactalbumin digest and fifty milligrams of Cerelose commercial dextrose per liter of tap water and adjusted to a pH of between about 5.5 and 5.9. To four liters of this medium containing a 24-hour growth of *Neurospora crassa*, ATCC 10336, there was added one gram of progesterone dissolved in fifty milliliters of acetone. After a bioconversion time of 48 hours at room temperature with aeration, the fermented steroid was extracted and chromatographed as in Example 1.

It is to be understood that the invention is not to be limited to the exact details of operation or exact organisms and compounds shown and described, as obvious modifications and equivalents will be apparent to one skilled in the art, and the invention is therefore to be limited only by the scope of the appended claims.

We claim:

1. A process for the introduction of oxygen into a steroid which comprises: growing a Neurospora under aerobic conditions in the presence of a fermentation medium containing assimilable non-steroidal carbon and a steroid having an eleven methylene group and recovering the resulting oxygenated steroid.

2. A process of fermenting a steroid which comprises: growing a Neurospora under submerged aerobic conditions in a fermentation medium containing assimilable non-steroidal carbon and a steroid having an eleven methylene group.

3. A process of fermenting a steroid which comprises: growing a Neurospora under submerged aerobic conditions in a fermentation medium containing carbohydrate and a steroid having an eleven methylene group.

4. A process of fermenting a steroid which comprises: growing a Neurospora under aerobic conditions in a fermentation medium containing carbohydrate and a steroid having an eleven methylene group and up to and including 22 carbon atoms in the carbon to carbon skeleton.

5. A process of oxygenating a steroid which comprises: aerobically subjecting a steroid containing an eleven methylene group to the oxygenating activity of a growth of Neurospora and isolating the resulting oxygenated steroid.

6. A process of fermenting a steroid which comprises: growing a Neurospora under aerobic submerged agitated conditions in a fermentation medium containing assimilable non-steroidal carbon and a steroid substrate, consisting essentially of steroid having an eleven methylene group, and recovering the resulting fermented steroid.

7. A process of fermenting a steroid which comprises: dispersing a steroid substrate, consisting essentially of a 3-keto steroid, in an aqueous nutrient medium, growing a Neurospora in said medium under aerobic conditions, and isolating the resulting fermented steroid.

8. A process of fermenting a steroid which comprises: aerobically contacting a growing Neurospora with a steroid substrate, consisting essentially of a steroid having up to and including 22 carbon atoms in the carbon to carbon skeleton, and recovering the resulting fermented steroid.

9. A process of oxygenating a steroid which comprises: growing a Neurospora under aerobic agitated conditions in a nutrient fermentation medium containing a steroid having an eleven methylene group, and isolating the resulting oxygenated steroid.

10. A process of oxygenating a steroid which comprises: growing a Neurospora under aerobic agitated conditions in a nutrient fermentation medium containing carbohydrate and a steroid and extracting the resulting oxygenated steroid.

11. A process which comprises: growing *Neurospora sitophila* under aerobic agitated conditions in a nutrient fermentation medium containing carbohydrate and steroid and extracting the resulting fermented steroid.

12. A process which comprises: dispersing a steroid substrate, consisting essentially of a steroid having an eleven methylene group and up to and including 22 carbon atoms in the carbon to carbon skeleton, in a fermentation medium and subjecting such dispersed steroid to the action of viable Neurospora under aerobic agitated conditions and recovering the resulting fermented steroid.

13. A process comprising growing a species of fungus of the genus Neurospora under aerobic agitated conditions in a nutrient fermentation medium containing a steroid substrate, consisting essentially of a steroid having an eleven methylene group and up to and including 22 carbon atoms in the carbon to carbon skeleton.

14. The process of claim 13 wherein the fungus is *Neurospora sitophila*.

15. A process comprising growing a species of fungus of the genus Neurospora under aerobic conditions in a nutrient fermentation medium containing progesterone.

16. The process of claim 15 wherein the fungus is *Neurospora sitophila*.

17. A process comprising growing a species of fungus of the genus Neurospora under aerobic conditions in a nutrient fermentation medium containing 17α-hydroxyprogesterone.

18. The process of claim 17 wherein the fungus is *Neurospora sitophila*.

19. A process comprising growing a species of fungus of the genus Neurospora under aerobic conditions in a nutrient fermentation medium containing 17α,21-dihydroxyprogesterone.

20. The process of claim 19 wherein the fungus is *Neurospora sitophila*.

21. A process comprising growing a species of fungus of the genus Neurospora under aerobic conditions in a nutrient fermentation medium containing pregnane-3,20-dione.

22. The process of claim 21 wherein the fungus is *Neurospora sitophila*.

23. A process comprising growing a species of fungus of the genus Neurospora under aerobic conditions in a nutrient fermentation medium containing a steroid selected from the group consisting of 21-hydroxy-4-pregnene-3,20-dione and 16-dehydroprogesterone.

24. The process of claim 23 wherein the fungus is *Neurospora sitophila*.

25. A process of fermenting a steroid which comprises: growing a Neurospora under aerobic submerged agitated conditions in a fermentation medium containing assimilable nitrogen, phosphate, carbohydrate, and a steroid substrate, consisting essentially of a steroid having an eleven methylene group, and recovering the resulting fermented steroid.

26. A process which comprises: dispersing a 3-keto steroid having an eleven methylene group in an aqueous fermentation medium containing assimilable nitrogen, phosphate and carbohydrate, and therein growing under aerobic agitated conditions a species of fungus of the genus Neurospora.

27. A process which comprises: growing a species of fungus of the genus Neurospora under aerobic agitated conditions in a fermentation medium containing assimilable nitrogen, phosphate, carbohydrate, and progresterone.

28. A process which comprises: growing a species of fungus of the genus Neurospora under aerobic agitated conditions in a fermentation medium containing assimilable nitrogen, phosphate, carbohydrate, and 17α-hydroxyprogesterone.

29. A process which comprises: growing a species of fungus of the genus Neurospora under aerobic agitated conditions in a fermentation medium containing assimilable nitrogen, phosphate, carbohydrate, and 17α,21-dihydroxyprogesterone.

30. A process which comprises: growing a species of fungus of the genus Neurospora under aerobic agitated conditions in a fermentation medium containing assimilable nitrogen, phosphate, carbohydrate, and pregnane-3,20-dione.

31. A process which comprises: growing a species of fungus of the genus Neurospora under aerobic agitated conditions in a fermentation medium containing assimilable nitrogen, phosphate, carbohydrate and a steroid selected from the group consisting of 21-hydroxy-4-pregnene-3,20-dione and 16-dehydroprogesterone.

References Cited in the file of this patent

UNITED STATES PATENTS

| Number | Name | Date |
| --- | --- | --- |
| 2,602,769 | Murray et al. | July 8, 1952 |

OTHER REFERENCES

Skinner et al.: Henrici's Molds, Yeasts and Actinomycetes, pages 251–252 (1947).

Colingsworth et al.: J. Am. Chem. Soc., vol. 74, pages 2381–2832, May 5, 1952.